(12) United States Patent
Rivera et al.

(10) Patent No.: US 9,477,261 B1
(45) Date of Patent: Oct. 25, 2016

(54) PORTABLE COMPUTER WITH CYLINDERS PROVIDING FRICTION IN HINGE

(71) Applicant: Google Inc., Mountain View, CA (US)

(72) Inventors: Felix Jose Alvarez Rivera, San Jose, CA (US); Daniel Fourie, San Mateo, CA (US)

(73) Assignee: Google Inc., Mountain View, CA (US)

( * ) Notice: Subject to any disclaimer, the term of this patent is extended or adjusted under 35 U.S.C. 154(b) by 164 days.

(21) Appl. No.: 13/767,837

(22) Filed: Feb. 14, 2013

(51) Int. Cl.
*E05D 7/00* (2006.01)
*G06F 1/16* (2006.01)
*B23P 11/00* (2006.01)

(52) U.S. Cl.
CPC .............. *G06F 1/1613* (2013.01); *B23P 11/00* (2013.01)

(58) Field of Classification Search
CPC ................................ G06F 1/1681; E05D 7/00
See application file for complete search history.

(56) References Cited

U.S. PATENT DOCUMENTS

| 3,507,000 | A | * | 4/1970 | Werner | ................ | B60N 2/2213 16/324 |
| 5,379,183 | A | * | 1/1995 | Okonsky | ............... | G06F 1/1616 16/342 |
| 5,987,704 | A | * | 11/1999 | Tang | ..................... | G06F 1/1681 16/342 |
| 6,182,330 | B1 | * | 2/2001 | Novin | .................... | G06F 1/1616 16/297 |
| 6,223,393 | B1 | * | 5/2001 | Knopf | ................... | G06F 1/1681 16/366 |
| 6,470,532 | B2 | * | 10/2002 | Rude | .................... | G06F 1/1616 16/313 |
| 6,519,812 | B2 | * | 2/2003 | Ko | ....................... | H04N 5/2251 16/248 |
| 6,690,579 | B1 | * | 2/2004 | Ribeiro | ................. | G06F 1/1613 361/728 |
| 6,900,981 | B2 | * | 5/2005 | Kuivas | ................... | E05D 3/122 248/920 |
| 7,512,426 | B2 | * | 3/2009 | Maatta | ................ | H04M 1/0218 16/354 |
| 7,656,661 | B2 | * | 2/2010 | Shaum | .................. | G06F 1/1616 361/679.55 |
| 7,667,959 | B2 | * | 2/2010 | Pelkonen | .............. | G06F 1/1616 248/923 |
| 8,353,082 | B2 | * | 1/2013 | Naukkarinen | ........ | H04M 1/022 16/354 |
| 8,638,546 | B2 | * | 1/2014 | Hoshino | ............... | G06F 1/1681 361/679.01 |
| 8,904,601 | B2 | * | 12/2014 | Hsu | ..................... | H04M 1/0216 16/366 |
| 2003/0226238 | A1 | * | 12/2003 | Baer | ....................... | E05D 3/022 16/354 |
| 2005/0101441 | A1 | * | 5/2005 | Rosborough | .......... | A63B 22/16 482/51 |
| 2005/0122671 | A1 | * | 6/2005 | Homer | .................. | G06F 1/1618 361/679.27 |
| 2005/0273978 | A1 | * | 12/2005 | Norman | ................ | E05D 11/082 16/342 |
| 2006/0238970 | A1 | * | 10/2006 | Ukonaho | .............. | H04M 1/022 361/679.01 |
| 2007/0094846 | A1 | * | 5/2007 | Ishida | ..................... | E05D 3/122 16/354 |
| 2007/0151381 | A1 | * | 7/2007 | Pelkonen | .............. | G06F 1/1616 74/437 |
| 2009/0068429 | A1 | * | 3/2009 | Kmiec | .................... | C08L 23/04 428/218 |
| 2009/0176391 | A1 | * | 7/2009 | Brock | ................ | H01R 13/5213 439/136 |
| 2011/0058916 | A1 | * | 3/2011 | Toosky | ................... | F16B 19/05 411/361 |
| 2012/0330201 | A1 | * | 12/2012 | Turner | .................. | A61H 19/40 601/46 |
| 2015/0138713 | A1 | * | 5/2015 | Onda | .................... | G06F 1/1679 361/679.27 |

* cited by examiner

Primary Examiner — Xanthia C Cunningham
(74) Attorney, Agent, or Firm — Brake Hughes Bellermann LLP

(57) ABSTRACT

A portable computer may include a base, a lid, a base cylinder extending from the base, a lid cylinder extending from the lid, and a link. The link may couple the base cylinder to the lid cylinder fixing a positional relationship between the base cylinder and the lid cylinder so that the base cylinder frictionally engages with the lid cylinder.

22 Claims, 10 Drawing Sheets

PORTABLE COMPUTER WITH CYLINDERS PROVIDING FRICTION IN HINGE

TECHNICAL FIELD

This description relates to hinges for portable computers.

BACKGROUND

Portable computers may include a lid and a base. The portable computer may include a hinge to allow the lid to rotate about the base. The hinge may have a limited range of rotation for the lid around the base, and/or may occupy space between the lid and the base.

SUMMARY

According to one general aspect, a portable computer may include a base, a lid, a base cylinder extending from the base, a lid cylinder extending from the lid, and a link. The link may couple the base cylinder to the lid cylinder fixing a positional relationship between the base cylinder and the lid cylinder so that the base cylinder frictionally engages with the lid cylinder.

According to another general aspect, a method of assembling a portable computer may include securing a base cylinder to a base of the portable computer, securing a lid cylinder to a lid of the portable computer, securing the base cylinder to a link, and securing the lid cylinder to the link. The securing of the base cylinder to the link and the lid cylinder to the link may fix a positional relationship between the base cylinder and the lid cylinder so that the base cylinder frictionally engages with the lid cylinder.

According to another general aspect, a portable computer may include a base, a lid, a base cylinder, a lid cylinder, and a link. The base may include at least one processor, at least one memory, a keyboard, and a tactile input device. The lid may include a display coupled to the at least one processor. The base cylinder may extend from the base, and include a rod extending from the lid and a rubber shell encasing the rod. The rubber shell may frictionally engage a lid cylinder and have a lower hardness than the rod. The lid cylinder may extend from the lid. The link may couple the base cylinder to the lid cylinder and fix a positional relationship between the base cylinder and the lid cylinder so that the base cylinder and lid cylinder are generally parallel to each other and the base cylinder frictionally engages with the lid cylinder.

The details of one or more implementations are set forth in the accompanying drawings and the description below. Other features will be apparent from the description and drawings, and from the claims.

DETAILED DESCRIPTION

Figure 1:
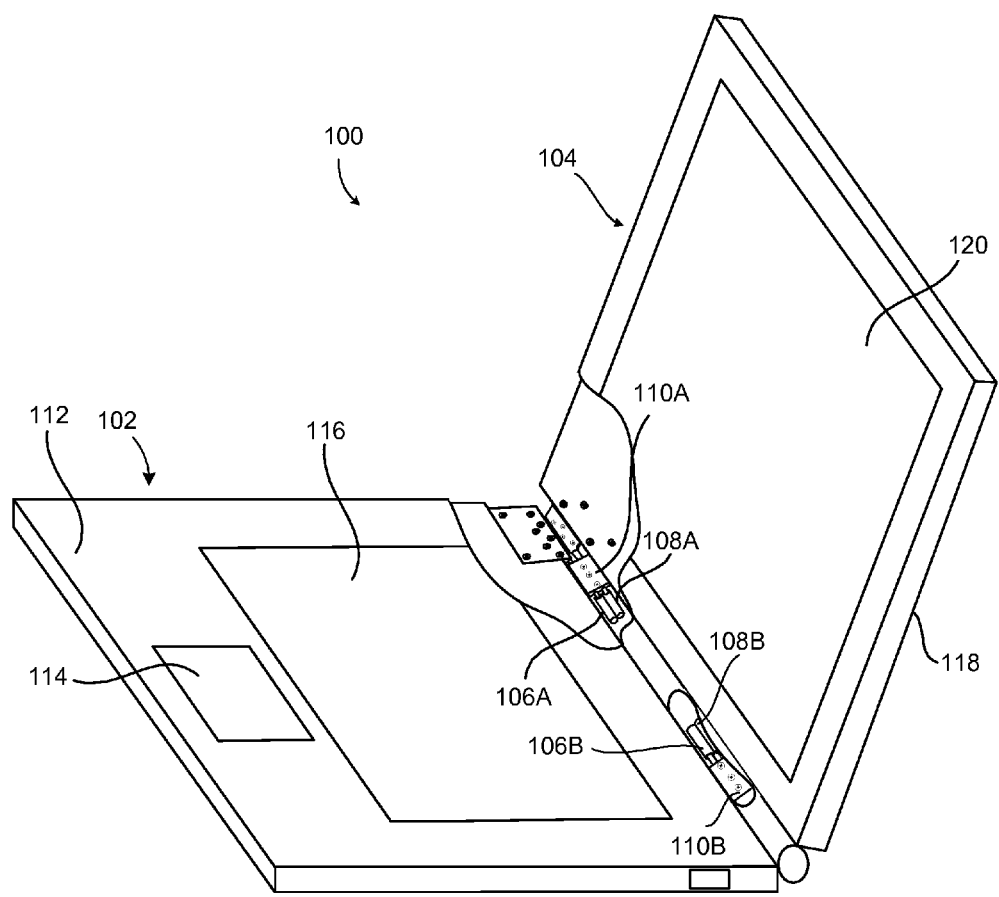
FIG. 1 is a perspective view of a portable computer according to an example embodiment.

FIG. 1 is a perspective view of a portable computer 100 according to an example embodiment. The portable computer 100 may include, for example, a laptop or notebook computer. The portable computer 100 may include a base 102 and a lid 104. The base 102 and lid 104 may be hingedly attached to each other, enabling the lid 104 to rotate around the base 102 so that a user of the portable computer 100 can change a viewing angle and/or change which side of the lid 104 is exposed and which side of the lid 104 rests against the base 102.

The base 102 and lid 104 may be hinged, connected, and/or hingedly attached to each other by one or more pairs of cylinders 106A, 108A, 106B, 108B. The hinges, including the pairs of cylinders 106A, 108A, 106B, 108B and links 110A, 110B are shown in cutout views in FIG. 1. The base cylinder 106A and lid cylinder 108A may be coupled to each other by a link 110A, and the base cylinder 106B and lid cylinder 108B may be coupled to each other by a link 110B. While two pairs of cylinders 106A, 108A, 106B, 108B are shown in the example portable computer 100 of FIG. 1, any number of pairs of cylinders 106A, 108A, 106B, 108B may be included in the portable computer 100. The cylinders 106A, 108A, 106B, 108B are shown in greater detail in subsequent figures.

The links 110A, 110B may couple their respective cylinders 106A, 108A, 106B, 108B. The coupling of the cylinders 106A, 108A, 106B, 108B by their respective links 110A, 110B may fix a positional relationship between the pairs of cylinders 106A, 108A, 106B, 108B so that the pairs of cylinders 106A, 108A, 106B, 108B frictionally engage with each other. The frictional engagement may cause the lid 104 to resist rotation around the base 102, causing the lid 104 to remain in place at a point around the base 102 while allowing the user to rotate the lid 104 around the base 102 by application of force.

The base 102 may include a housing 112. The housing 112 may be made of a rigid material, such as plastic or metal. The housing 112 may enclose components of the portable computer 100, such as a central processing unit (CPU), memory, a battery, and sensors for detecting input into the portable computer 100. At an end portion, the housing 112 may have a thickness of, for example, half a centimeter, between one-third and two-thirds centimeters, between one-fourth and three-fourths centimeters, between one-half and one centimeter, between one-half and one-and-a-half centimeters, or between one and two centimeters. The housing 112 may have a uniform thickness across the housing 112, or may have different thicknesses at different portions of the housing 112.

The base 102 may also include a tactile input device 114. The tactile input device 114 may include, for example, a trackpad or touchpad, and may enable the user to provide mouse inputs to the portable computer 100. The tactile input device 114 may receive, for example, touch, tap, and/or swipe inputs from the user. The tactile input device 114 may be coupled to one or more sensors inside the base 102 that provide input to the CPU of the portable computer 100.

The base 102 may also include a keyboard 116. The keyboard 116 may include keys for providing input into the portable computer 100, such as alphanumeric keys, function keys, modifier keys, and/or directional keys. The keyboard 116 may be coupled to one or more sensors inside the base 102 that provide input to the CPU of the portable computer 100.

The lid 104 may also include a housing 118. The housing 118 may be made of a rigid material, such as plastic or metal. At an end portion, the housing 118 of the lid 104 may have a thickness that is similar to, the same as, and/or identical to the thickness of the housing 118 of the base 102. The housing 118 of the lid 104 may have a same thickness throughout the housing 118 of the lid 104, or may have different thicknesses at different portions of the housing 118 of the lid 104.

The lid 104 may include a display 120. The display 120 may provide visual output to the user, and may include, for example, a liquid crystal display (LCD), plasma display, or light-emitting diode (LED) display, as non-limiting examples. The display 120 may also receive input from the user, in the example embodiment in which the display 120 includes a touchscreen.

Figure 2A:
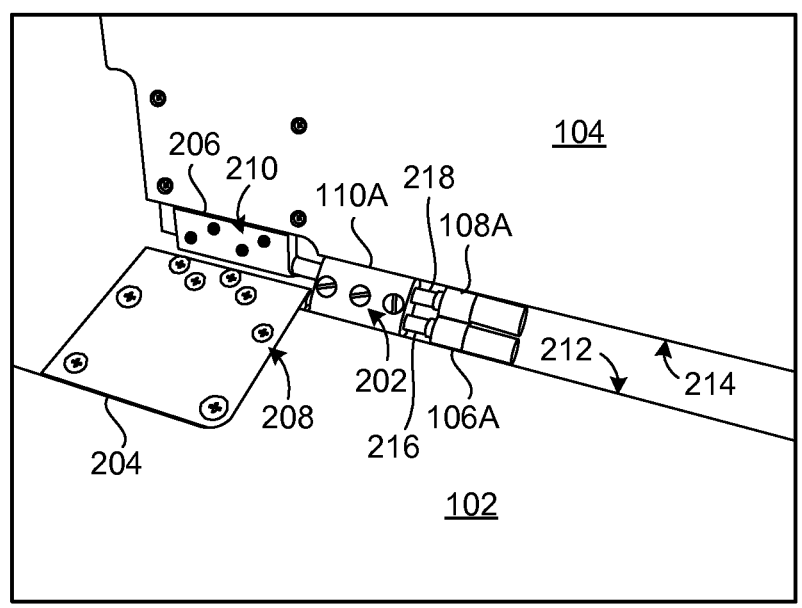
FIG. 2A is a perspective view of a hinge of the portable computer according to an example embodiment.

FIG. 2A is a perspective view of a hinge of the portable computer 100 according to an example embodiment. In this example, the hinge includes the base cylinder 106A, the lid cylinder 108A, and the link 110A. Other hinges, such as a hinge that includes the base cylinder 106B, 108B, and link 110B shown in FIG. 1, may include similar components.

The base cylinder 106A extends from the base 102. The base cylinder 106A may extend from a base extender 204 in a direction parallel to an edge 212 or end portion of the base 102. The base extender 204 may be a component retrofitted onto the base 102 to receive a rod 216 included in the cylinder 106A The base extender 204 may extend away from the base 102 to allow the rod 216 to reside inside the base extender 204 and extend in a directional generally parallel to the edge 212 or end portion of the base 102, without any part of the rod 216 or cylinder 106A touching or contacting the base 102. The base extender 204 may be considered part of the base 102, or may be considered a separate component attached to the base 102. The base extender 204 may have a same or identical thickness as the housing 112 of the base 102. The base extender 204 may extend beyond the edge 212 or end portion of the base 102 to allow the base cylinder 106A to extend in a parallel direction to the base 102 without contacting the base 102. The base extender 204 may be made of two pieces, as shown and described with respect to FIG. 2C. The base extender 204 may also be integrally formed with the base 102.

The lid cylinder 108A extends from the lid 104, and may extend from a lid extender 206. The lid cylinder 108A may extend from the lid extender 206 in a direction parallel to an edge 214 or end portion of the lid 104. The lid extender 206 may have a same or identical thickness as the housing 118 of the lid 104, and may extend beyond the edge 214 or end portion of the lid 104 to allow the lid cylinder 108A, and a rod 218 included in the lid cylinder 108A, to extend in a parallel direction to the lid 104 without contacting the lid 104. The rod 218 may reside in the lid extender 206. The lid extender 206 may have similar features to the base extender 204 described above. The lid extender 206 may be made of a single or multiple pieces, and if made of multiple (such as two) pieces, may be secured to the lid 104 by fasteners 210, similarly to the base extender 204 described above and with respect to FIG. 2C. The lid extender 206 may also be integrally formed with the lid 104.

The hinge may include the link 110A coupling the base cylinder 106A to the lid cylinder 108A. The link 110A may be made of a sufficiently hard material, such as metal including steel, to prevent translational movement of the rods 216, 218 included in the cylinders 106A, 108A within the link 110A, while allowing the cylinders 106A, 108A to rotate with respect to each other and allowing the rods 216, 218 to rotate within the link 110A. The translational movement of the rods 216, 210 within the link 110A may also be prevented by including stoppers and/or retaining rings within the link 110A, as non-limiting examples.

The link 110A may couple the base cylinder 106A to the lid cylinder 108A and fix the positional relationship between the base cylinder 106A and lid cylinder 108A so that the base cylinder 106A and lid cylinder 108A are generally parallel and the base cylinder 106A and lid cylinder 108A frictionally engage with each other. The frictional engagement between the base cylinder 106A and lid cylinder 108A (and any other pairs of cylinders) may cause the lid 104 to resist rotation around the base 102, thereby causing the lid 104 to remain in position with respect to the base 102. A user of the portable computer 100 may apply sufficient rotational force to the lid 104 and/or base 102 to overcome the resistance and cause the lid 104 to rotate about the base 102, thereby changing the positional relationship between the lid 104 and base 102.

The rods 216, 218 included in the cylinders 106A, 108A may extend through the link 110A into the respective base 102 and lid 104 and/or base extender 204 and lid extender 206. The link 110A may be made of a single piece, or multiple, such as two or more pieces. An example of the link 110A made of two pieces is shown and described with respect to FIG. 2C.

In the example shown in FIG. 2A, the pieces of the link 110A are attached to each other by fasteners 202. The fasteners 202 may include bolts with threads. The threads of the bolts may engage threaded apertures in the link 110A, and/or may engage nuts with threaded apertures on an opposite side of the link 110A. The two pieces of the link 110A may also be attached by adhesive, such as glue, or by welding.

Figure 2B:
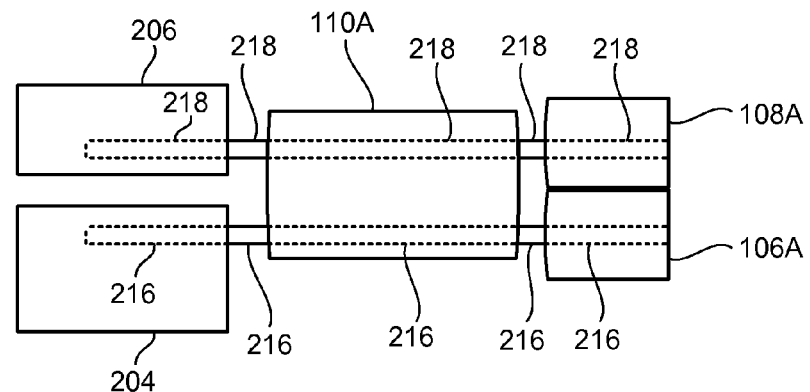
FIG. 2B is a cross-sectional view of the hinge according to an example embodiment.

FIG. 2B is a cross-sectional view of the hinge according to an example embodiment. In this example, the rod 216 may extend through the base extender 204 and link 110A and into the cylinder 106A. The rod 216 may be secured within the cylinder 106A and base extender 204 so that the rod 216 may not rotate with respect to the cylinder 106A or the base extender 204. However, the rod 216 may rotate freely within the link 110A. Similarly, the rod 218 may extend through the lid extender 206 and link 110A and into the cylinder 108A, and may be secured within the cylinder 108A and lid extender 206 so that the rod 218 may not rotate with respect to the cylinder 108A or lid extender 206, but may rotate with respect to the link 110A.

Figure 2C:
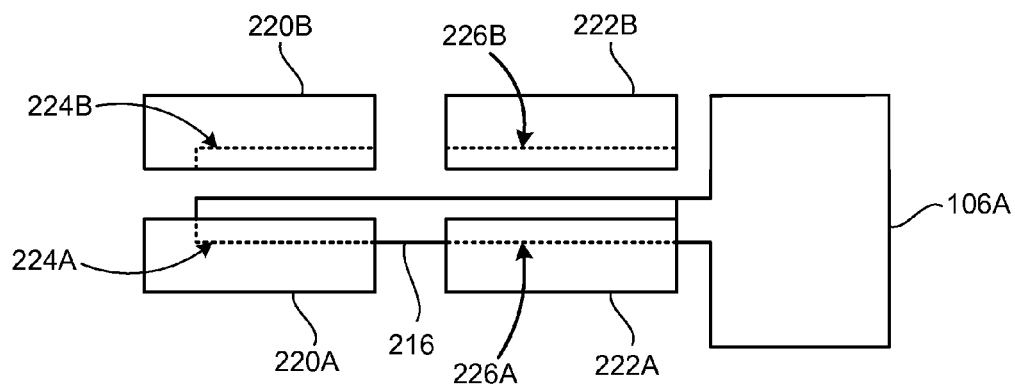
FIG. 2C is another cross-sectional view of the hinge, with pieces of a base extender and link not yet secured together, according to an example embodiment.

FIG. 2C is another cross-sectional view of the hinge, with first and second pieces 220A, 220B of the base extender 204 (references in FIGS. 2A and 2B) and first and second pieces 222A, 222B of the link 110A (references in FIGS. 1, 2A, and 2B) not yet secured together, according to an example embodiment. The two pieces 220A, 220B of the base extender may each attach from a top and bottom direction of the housing 112 (referenced in FIG. 1) of the base 102 (references in FIGS. 1 and 2A).

The two pieces 220A, 220B of the base extender 204 may be attached to each other by fasteners 208 (shown and referenced in FIG. 2A). The fasteners 208 may include bolts with threads. The threads of the bolts may engage threaded apertures in the pieces 220A, 220B of the base extender 204, and/or may engage nuts with threaded apertures on an opposite piece 220A, 220B of the base extender 204. The two pieces 220A, 220B of the base extender 204 may also be attached by adhesive, such as glue, or the base extender 204 may be made of a single piece.

In an example implementation, a first piece 220A of the base extender 204 may be attached to the base 102, such as by fasteners or adhesive. The rod 216 of the cylinder 106A may be placed into a groove 224A of the first piece 220A of the base extender 204. A second piece 220B of the base extender 204 may be placed over the first piece 220A of the base extender 204 and the rod 216, aligning a groove 224B of the second piece 220B with the rod 216, to enclose the rod 216 between the first and second pieces 220A, 220B of the base extender 204. The second piece 220B of the base extender 204 may then be secured to the first piece 220A of the base extender 204 and/or base 102, such as by fasteners or adhesive. The lid extender 206 (shown in FIG. 2A) may also be put together with the rod 218 (shown in FIGS. 2A and 2B) inside the lid extender 206 in a similar manner as the base extender 204.

In an example in which the link 110A is made of two pieces, the rod 216 of the cylinder 106A may be inserted through the pieces 222A, 222B of the link 110A when the pieces 222A, 222B of the link 110A are separate. The pieces 222A, 222B of the link 110A may be attached to each other after the rod 216 of the cylinder 106A has been inserted through the pieces 222A, 222B of the link 110A. In an example implementation, the rod 216 may be placed onto a groove 226A of a first piece 222A of the link 110A. A second piece 222B of the link 110A may be placed over the rod 216 and the first piece 222B of the link 110A, aligning a groove 226B of the second piece 222B with the rod 216, to enclose the rod 216 between the first and second pieces 222A, 222B of the link 110A, coupling the cylinders 106A, 106B to each other when both rods 216, 218 have been enclosed within the link 110A. After the second piece 222B of the link 110A has been placed over the first piece 222A of the link 110A and the rods 216, 218, the first and second pieces 222A, 222B of the link 110A may be secured to each other, such as by fasteners.

Figure 3A:
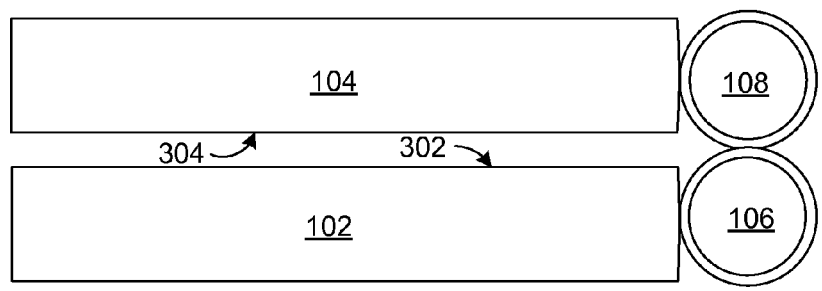
FIG. 3A is a side view of the portable computer according to an example embodiment.

FIG. 3A is a side view of the portable computer 100 according to an example embodiment. In this example, the base 102 and lid 104 are parallel to each other, with a front 304 of the lid 104 facing a top 302 of the base 102. The link(s) 110A, 110B is hidden by the cylinders 106, 108 (which may include either of the pairs of cylinders 106A, 108A, 106B, 108B shown in FIG. 1) with the link(s) 110A, 110B closer to a middle of the portable computer 100 than the cylinders 106, 108; in an example in which the link(s) 110A, 110B are farther from the middle of the portable computer 100 than the cylinders 106, 108, the link(s) 110A, 110B would obstruct the view of the cylinders 106, 108 from the side view shown in FIG. 3A.

As discussed above, the contact and frictional engagement of the cylinders 106, 108 with each other cause the cylinders 106, 108 to resist rotational movement by the base 102 and lid 104 with respect to each other. The resistance to rotational movement will cause the base 102 and lid 104 to remain in place with respect to each other until the user applies sufficient rotational force or torque to overcome the resistance and cause the lid 104 to rotate with respect to the base 102 and/or cause the base 102 to rotate with respect to the lid 104.

Figure 3B:
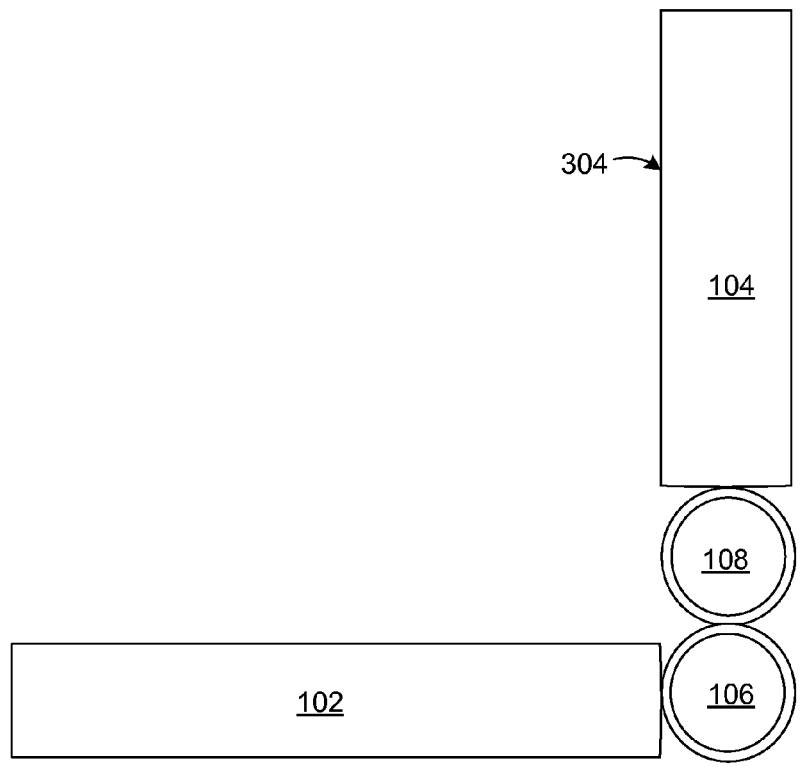
FIG. 3B is another side view of the portable computer according to an example embodiment.

FIG. 3B is another side view of the portable computer 100 according to an example embodiment. In this example, the user has applied force to the lid 104 in a direction away from the base 102, causing the lid 104 to rotate away from the base 102 into a position about 90° from, or perpendicular to, the base 102. In this position, the user may be able to view the display 120 (not shown in FIG. 3B) on the front 304 of the lid 104 with the base 102 resting on a desk or table.

Figure 3C:
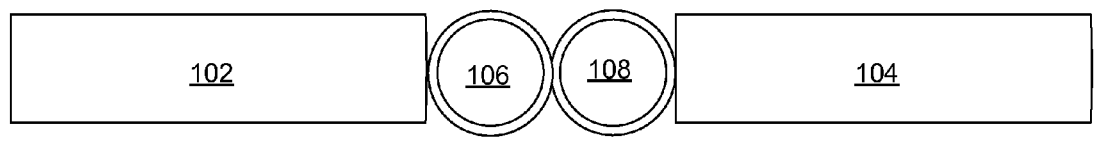
FIG. 3C is another side view of the portable computer according to an example embodiment.

FIG. 3C is another side view of the portable computer 100 according to an example embodiment. In this example, the user has applied force to the lid 104 in a direction away from the base 102, causing the lid 104 to rotate away from the base 102 into a position about 180° from, or laying away from, the base 102. In this position, the base 102 and lid 104 are parallel to, and facing away from, each other.

Figure 3D:
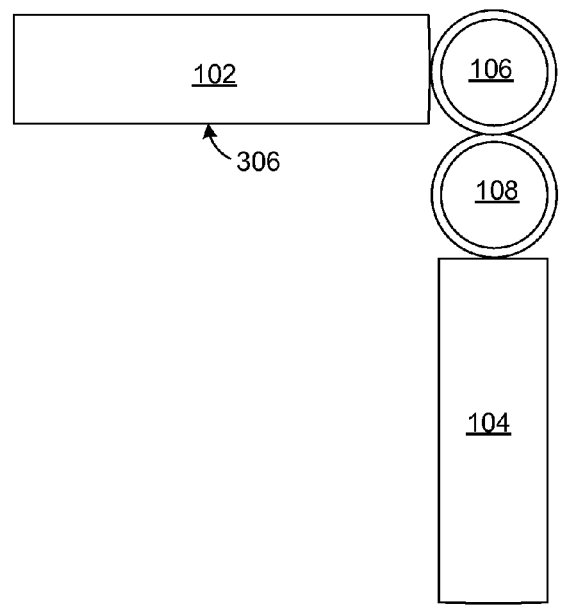
FIG. 3D is another side view of the portable computer according to an example embodiment.

FIG. 3D is another side view of the portable computer 100 according to an example embodiment. In this example, the user has pushed the lid 104 toward a bottom of the base 102, causing the lid 104 to rotate toward a bottom 306 of the base 102. In this position, the lid 104 has rotated a total of 270° degrees away from the top of the base 102.

Figure 3E:
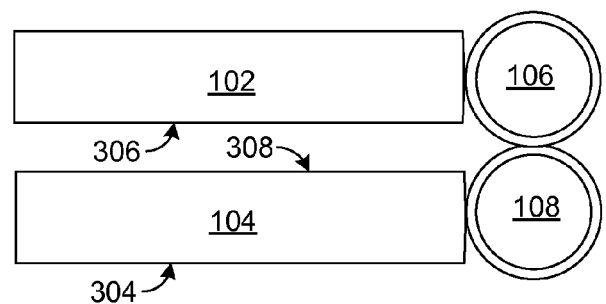
FIG. 3E is another side view of the portable computer according to an example embodiment.

FIG. 3E is another side view of the portable computer 100 according to an example embodiment. In this example, the user has pushed the lid 104 toward the bottom of the base 102. The lid 104 has rotated a total of 360° away from the base 102. The base 102 and lid 104 are parallel, with the bottom 306 of the base 102 facing a back 308 of the lid 104. The front 304 of the lid 104 is facing away from the base 102, allowing the user to treat the portable computer 100 as a tablet computer, with the display 120 (not shown in FIG. 3E) occupying most of the surface area on the front 304 of the lid 104, which may be facing the user.

The cylinders 106, 108, as well as other pairs of cylinders, may occupy a small space within the portable computer 100. By occupying a small space, while allowing 360° of rotation, the hinge that includes the cylinders 106, 108 may improve the user experience by allowing the user to choose a position for the lid 104 relative to the base 102 through a 360° range of motion, while still minimizing the space occupied by the hinge within the portable computer 100.

Figure 4A:
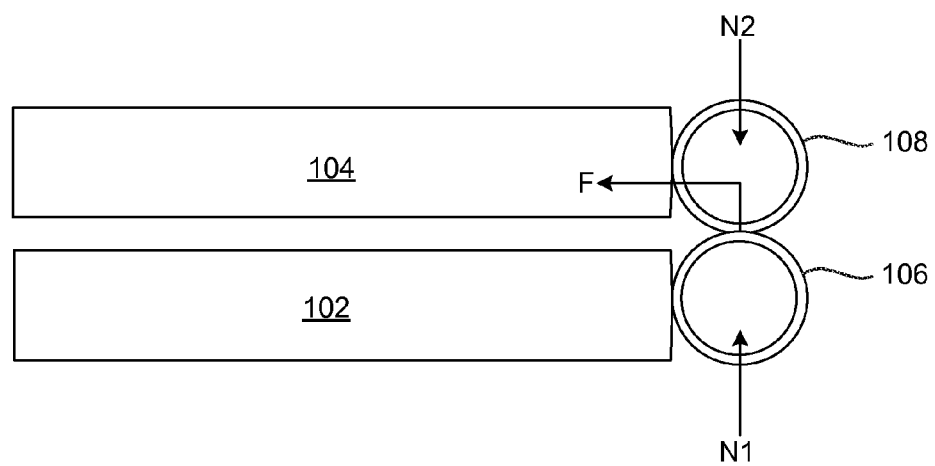
FIG. 4A is a side view of the portable computer showing forces exerted within the hinge according to an example embodiment.

FIG. 4A is a side view of the portable computer 100 showing forces exerted within the hinge according to an example embodiment. A sum of radii of the cylinders 106, 108 (which may represent either of the pairs of cylinders 106A, 108A, 106B, 108B discussed above) in uncompressed form (and/or an uncompressed diameter of either cylinder 106, 108) may be greater than a distance between central axes of the cylinders when the cylinders 106, 108 are attached to the base 102 and lid 104 by the link 110 (which may represent either of the links 110A, 110B and is not shown in FIG. 4A). The link 110 may force the cylinders 106, 108 into close, compressed contact with each other. The close, compressed contact of the cylinders 106, 108 with each other may cause each of the cylinders 106, 108 to exert normal forces N1, N2 on each other. The base cylinder 106 may exert normal force N1 on the lid cylinder 108, and the lid cylinder 108 may exert normal force N2 on the base cylinder 106.

The normal forces N1, N2 may cause the cylinders 106, 108 to exert a frictional force F on each other in response to either of the cylinders 106, 108 rotating with respect to the other. The frictional force F may prevent or reduce rotation by the cylinders 106, 108 with respect to each other, causing the hinge to resist rotation of the base 102 and lid 104 with respect to each other. The resistance to rotation may cause the base 102 and lid 104 to remain in fixed positions with respect to each other until the user applies sufficient torque and/or rotational force to overcome the resistance and cause the base 102 and/or lid 104 to rotate with respect to each other.

Normal forces N1, N2, which press the cylinders 106, 108 together, may be caused by the link 110 forcing the cylinders 106, 108 together. The normal forces N1, N2 may each be about twenty Newtons, such as between fifteen and twenty-five Newtons, ten and thirty Newtons, or between five and thirty-five Newtons. A force of friction F, which prevents the cylinders 106, 108 from rotating relative to each other when compressed against each other by the link 110, may be about thirty-one Newtons, such as between twenty-five and thirty-five Newtons, between twenty and forty Newtons, or between ten and fifty Newtons.

Figure 4B:
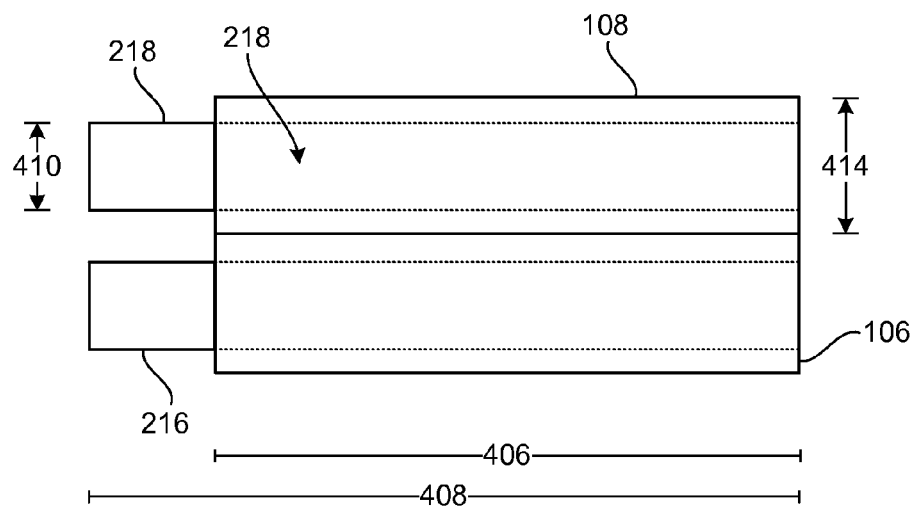
FIG. 4B is a cross-sectional view of cylinders that are part of the hinge according to an example embodiment.

FIG. 4B is a cross-sectional view of the cylinders 106, 108 that are part of the hinge according to an example embodiment. In this example, the cylinders 106, 108 include rods 216, 218 extending through the cylinders 106, 108. The rods 216, 218 may be made of harder, stronger, or less pliable material than the remainder (or shell, described below) of the cylinders 106, 108. The rods 216, 218 may be made, for example, of steel.

The rods 216, 218 may be partially encased or surrounded by shells (labeled in FIG. 4C) that increase a diameter of the cylinders 106, 108 along the portions of the cylinders 106, 108 along which the rods 216, 218 are encased by the shells. The shells may have a length 406 of about five millimeters, such as between four and six millimeters, three and seven millimeters, or one and ten millimeters. The rods 216, 218 may have a longer length 408 than the length 406 of the shells. The rods 216, 218 may, for example, have a length 408 of about six millimeters, such as between five and seven millimeters, four and eight millimeters, three and nine millimeters, or two and ten millimeters.

The rods 216, 218 may have a diameter 410 or width of about one millimeter, such as between 0.75 and 1.25 millimeters or between 0.5 and 1.5 millimeters, according to an example embodiment. According to another example embodiment, the rods 216, 218 may also have a diameter 410 or width of about two millimeters, such as between 1.75 and 2.25 millimeters, between 1.5 and 2.5 millimeters, or between one and three millimeters. The cylinders 106, 108, including both the rods 216 and shells, may have a diameter 412 or width of about 1.75 millimeters, such as between 1.5 and 2.0 millimeters, 1.25 and 2.25 millimeters, or 1.0 and 2.5 millimeters, according to an example embodiment. According to another example embodiment, the cylinders 106, 108 may also have a diameter 412 or width of about 3.5 millimeters, such as between 3.25 and 3.75 millimeters, between three and four millimeters, between 2.5 and 4.5 millimeters, or between two and five millimeters. The cylinders 106, 108 may have their diameter 412 or width increased beyond the diameter 410 or width of the rods 216, 218 by a thickness of the shells. The shells may have a thickness of about 0.75 millimeters, such as between 0.5 and 1.0 millimeters.

Figure 4C:
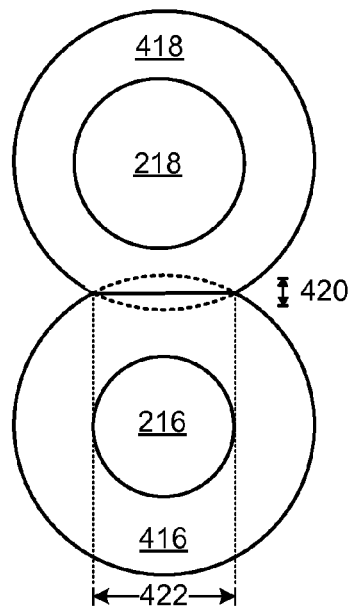
FIG. 4C is another cross-sectional view of the cylinders according to an example embodiment.

FIG. 4C is another cross-sectional view of the cylinders 106, 108 according to an example embodiment. The cylinders, including shells 416, 418 surrounding the rods 216, 218, may be circular from the cross-sectional view, and cylindrical in three dimensions. The outside surfaces of the shells 416, 418 may be smooth, without teeth, irregular shapes, or protrusions. As shown in FIG. 4C, the rods 216, 218 may form an inner diameter or portion of the cylinders 106, 108. As discussed above with reference to FIG. 4B, the rods 216, 218 have a diameter or width of about one millimeter, such as between 0.75 and 1.25 millimeters or between 0.5 and 1.5 millimeters.

Shells 416, 418 may form outer portions of the cylinders 106, 108. As discussed above with reference to FIG. 4B, the shells 416, 418 may have a thickness of about 0.75 millimeters, such as between 0.5 and 1.0 millimeters, and/or less than one millimeter. When the cylinders 106, 108 are forced together by the link 110 (not shown in FIG. 4C), the shells 416, 418 may be compressed together and/or displaced. The shells 416, 418 may have a compression distance 420 of about 0.5 millimeters, such as between 0.25 and 0.75 millimeters. The compression distance 420 may reflect a total reduction in the sum of the diameters of the cylinders 106, 108; the cylinders 106, 108 may each have their diameters reduced by half of the compression distance 420. The compression may cause a distance between central axes of the base cylinder 106 and lid cylinder 108 to be less than an uncompressed distance of either the base cylinder 106 or lid cylinder 106. A width 422 of the portion of the shells 416, 418 that is compressed may be about one millimeter, such as between 0.75 millimeters and 1.25 millimeters or between 0.5 millimeters and 1.5 millimeters. While FIG. 4C shows the width 422 of compression as being the same as the diameter 410 of the rods 216, 218, the width 422 of compression need not be the same as the diameter 410 of the rods 216, 218.

The shells 416, 418 may be made of softer or more pliant material than the rods 216, 218. The shells 416, 418 may be made, for example, of rubber. The shells 416, 418 may have a Shore D durometer of about fifty-five, such as between fifty and sixty, forty and seventy, or thirty and eighty. The shells 416, 418 may also have a coefficient of static friction, when compressed against each other, of about 1.5, such as between 1.25 and 1.75 or between 1.0 and 2.0.

The shells 416, 418 may also have a Young's modulus of about six MegaPascals, such as between five and seven MegaPascals, four and eight MegaPascals, three and nine MegaPascals, or two and ten MegaPascals. The portions of the shells 416, 418 that are compressed may have a stiffness of about four Newtons per meter, such as between three and five Newtons per meter, two and six Newtons per meter, or one and seven Newtons per meter. The link 110 (not shown in FIG. 4C) may force the cylinders 106, 108 close together, compressing the shells 416, 418. The compression may reduce the diameter or extension of the shells 416, 418 and/or cylinders by a compression length 420.

Figure 4D:
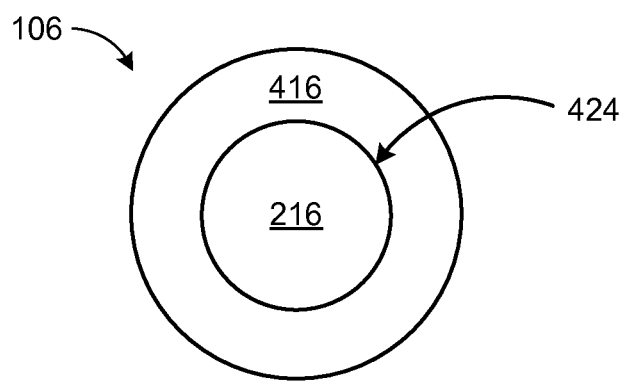
FIG. 4D is a cross-sectional view of one cylinder according to an example embodiment.

FIG. 4D is a cross-sectional view of one cylinder 106 according to an example embodiment. In this example, the rod 216 is attached or secured to the shell 416 by an adhesive 424. The adhesive 424 prevents the shell 416 from rotating relative to the rod 216. The adhesive 424 may include glue or epoxy. The shell 416 may also be heat bonded to the rod 216, according to an example embodiment.

Figure 4E:
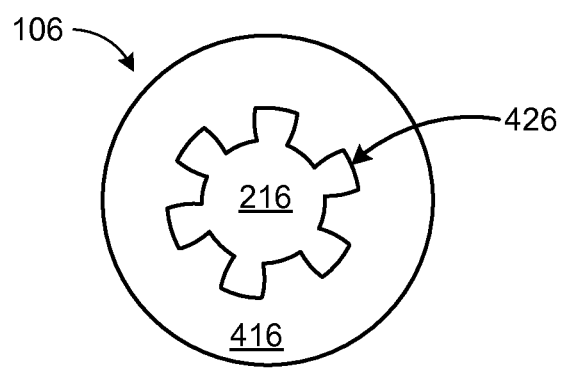
FIG. 4E is a cross-sectional view of one cylinder according to another example embodiment.

FIG. 4E is a cross-sectional view of one cylinder 106 according to another example embodiment. In this example, the rod 216 is attached or secured to the shell 416 by splines 426. The splines 426 prevent the shell 416 from rotating relative to the rod 216. The splines 426 may include interlocking grooves and teeth. The grooves and teeth of the rod 216 and shell 416 may interlock and/or mate with each other to prevent the rod 216 and shell 416 from rotating with respect to each other.

Figure 5:
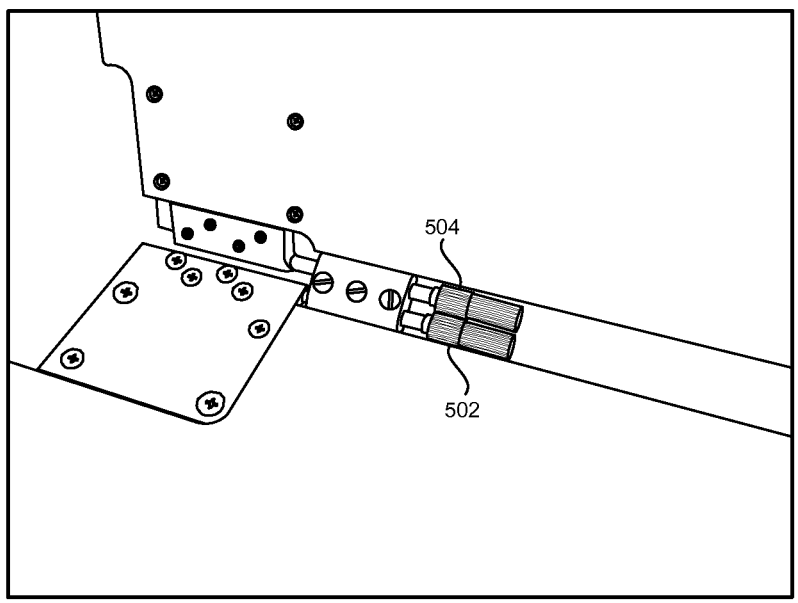
FIG. 5 a perspective view of a hinge of the portable computer according to another example embodiment.

FIG. 5 a perspective view of a hinge of the portable computer 100 according to another example embodiment. In this example, the cylinders 502, 504 include gears or teeth. The gears or teeth of the cylinders 502, 504 mesh and/or interlock with each other, preventing the cylinders 502, 504 from rotating relative to each other. In other respects, the cylinders 502, 504 may act similarly to the cylinders 106, 108, 106A, 108A, 106B, 108B described above.

Figure 6:
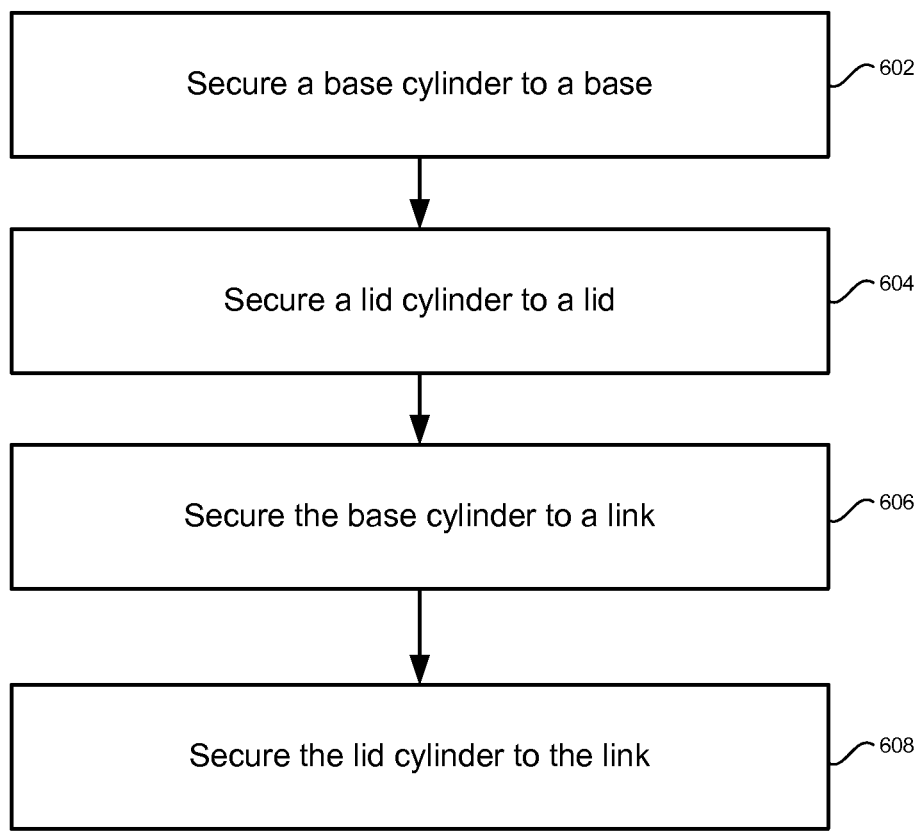
FIG. 6 is a flowchart showing a method of assembling a portable computer according to an example implementation.

FIG. 6 is a flowchart showing a method of assembling a portable computer 100 according to an example implementation. According to this example, the method may include securing a base cylinder 106 to a base 102 of the portable computer 100 (602). The method may also include securing a lid cylinder 108 to a lid 104 of the portable computer 100 (604). The method may also include securing the base cylinder 106 to a link 110A, 110B (606). The method may also include securing the lid cylinder 108 to the link 110A, 110B, the securing of the base cylinder 106 to the link 110A, 110B and the lid cylinder 108 to the link 110A, 110B fixing a positional relationship between the base cylinder 106 and the lid cylinder 108 so that the base cylinder 106 frictionally engages with the lid cylinder 108 (608).

According to an example implementation, the securing the base cylinder 106 to the base 102 of the portable computer 100 (602) may include placing the base cylinder 106 onto a first part of a base extender 204 attached to the base 102, placing a second part of the base extender 204 over the base cylinder 106 and the first part of the base extender 204 to enclose the base cylinder 106 between the first part of the base extender 204 and the second part of the base extender 204, and securing the first part of the base extender 204 to the second part of the base extender 204.

According to an example implementation, the method may further comprise securing the base extender 204 to the base 102. The securing the base extender 204 to the base 102 may include securing the first part of the base extender 204 to the base 102, and securing the second part of the base extender 204 to the base 102 after placing the second part of the base extender 204 over the base cylinder 106 and the first part of the base extender 204, thereby enclosing the base cylinder 106 between the first part of the base extender 204 and the second part of the base extender 204.

According to an example implementation, the securing the lid cylinder 108 to the link 110A, 110B may include placing the base cylinder 106 onto a first part of link 110A, 110B, placing a second part of the link 110A, 110B over the base cylinder 106 and the first part of the link 110A, 110B to enclose the base cylinder 106 between the first part of the link 110A, 110B and the second part of the link 110A, 110B, and securing the first part of the link 110A, 110B to the second part of the link 110A, 110B.

According to an example implementation, the securing the lid cylinder 108 to the link 110A, 110B may include fixing the positional relationship between the base cylinder 106 and the lid cylinder 108 so that the base cylinder 106 and lid cylinder 108 are generally parallel to each other.

According to an example implementation, the method may further include forming the base cylinder 106 by encasing a rod 216 with a shell 416, the shell 416 having a lower hardness than the rod 40. The rod 216 of the base cylinder 106 may extend from the base 102 of the portable computer 100. The shell 416 of the base cylinder 106 may frictionally engage the lid cylinder 108.

According to an example implementation, the forming the base cylinder 106 may further include attaching the shell 416 to the rod 216 by an adhesive 424.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A portable computer comprising:
   a base;
   a lid;
   a base cylinder extending from the base, a length of the base cylinder being greater than a diameter of the base cylinder, the base cylinder including a base rod and a base shell encasing the base rod, the base shell having a lower hardness than the base rod;
   a lid cylinder extending from the lid, a length of the lid cylinder being greater than a diameter of the lid cylinder, the lid cylinder including a lid rod and a lid shell encasing the lid rod, the lid shell having a lower hardness than the lid rod; and
   a link coupling the base cylinder to the lid cylinder, a length of the link in a direction parallel to a direction in which the base cylinder and the lid cylinder extend through the link being greater than a width of the link in a direction perpendicular to the direction in which the base cylinder and the lid cylinder extend through the link, the link being in direct contact with both the base cylinder and the lid cylinder and fixing a positional relationship between the base cylinder and the lid cylinder so that the base shell frictionally engages with the lid shell.

2. The portable computer of claim 1, wherein the base rod comprises steel.

3. The portable computer of claim 1, wherein the base shell comprises rubber.

4. The portable computer of claim 1, wherein the base shell is attached to the base rod by an adhesive.

5. The portable computer of claim 1, wherein the base shell is mated to the base rod by splines.

6. The portable computer of claim 1, wherein the base shell has a thickness of less than one millimeter.

7. The portable computer of claim 1, wherein the base shell has a Shore D durometer between fifty and sixty.

8. The portable computer of claim 1, wherein the base shell has a Shore D durometer between thirty and eighty.

9. The portable computer of claim 1, wherein the link fixes the positional relationship between the base cylinder and the lid cylinder so that the base cylinder and lid cylinder are generally parallel to each other.

10. The portable computer of claim 1, wherein a distance between central axes of the base cylinder and the lid cylinder is less than an uncompressed diameter of the base cylinder.

11. The portable computer of claim 1, wherein the link enables the lid to rotate about the base from a first position in which a front of the lid is facing a top of the base to a second position in which a back of the lid is facing a bottom of the base.

12. The portable computer of claim 1, wherein the base cylinder is exposed beyond the link and the lid cylinder is exposed beyond the link.

13. The portable computer of claim 1, wherein the link includes two pieces, the two pieces of the link being attached by fasteners.

14. The portable computer of claim 1, wherein the link forces the base cylinder and the lid cylinder into close, compressed contact with each other.

15. A method of assembling a portable computer, the method comprising:
  securing a base cylinder to a base of the portable computer, the base cylinder being without teeth, a length of a portion of the base cylinder that frictionally engages a lid cylinder being greater than a diameter of the portion of the base cylinder that frictionally engages the lid cylinder;
  securing the lid cylinder to a lid of the portable computer, the lid cylinder being without teeth, a length of a portion of the lid cylinder that frictionally engages the base cylinder being greater than a diameter of the portion of the lid cylinder that frictionally engages the base cylinder;
  securing the base cylinder to a link so that the base cylinder is in contact with the link; and
  securing the lid cylinder to the link so that the lid cylinder is in contact with the link, the securing of the base cylinder to the link and the lid cylinder to the link fixing a positional relationship between the base cylinder and the lid cylinder so that the base cylinder frictionally engages with the lid cylinder, a length of the link in a direction parallel to a direction in which the base cylinder and the lid cylinder extend through the link being greater than a width of the link in a direction perpendicular to the direction in which the base cylinder and the lid cylinder extend through the link.

16. The method of claim 15, wherein the securing the lid cylinder to the link comprises:
  placing the base cylinder onto a first part of the link;
  placing a second part of the link over the base cylinder and the first part of the link to enclose the base cylinder between the first part of the link and the second part of the link; and
  securing the second part of the link to the first part of the link by fasteners.

17. The method of claim 15, wherein the securing the lid cylinder to the link comprises fixing the positional relationship between the base cylinder and the lid cylinder so that the base cylinder and lid cylinder are generally parallel to each other.

18. The method of claim 15, further comprising:
  forming the base cylinder by encasing a rod with a shell, the shell having a lower hardness than the rod,
  wherein the rod of the base cylinder extends from the base of the portable computer, and the shell of the base cylinder frictionally engages the lid cylinder.

19. A portable computer comprising:
  a base comprising at least one processor, at least one memory, a keyboard, and a tactile input device;
  a lid comprising a display coupled to the at least one processor;
  a base cylinder extending from the base, the base cylinder including a base rod extending from the base and a rubber base shell encasing the base rod, a length of the rubber base shell being greater than a diameter of the rubber base shell;
  a lid cylinder extending from the lid, the lid cylinder including a lid rod extending from the lid cylinder and a rubber lid shell encasing the lid rod, a length of the rubber lid shell being greater than a diameter of the rubber lid shell; and
  a link coupling the base cylinder to the lid cylinder, the link being in direct contact with both the base cylinder and the lid cylinder and fixing a positional relationship between the base cylinder and the lid cylinder so that the base cylinder and lid cylinder are generally parallel to each other and the rubber base shell frictionally engages with the rubber lid shell, a length of the link in a direction parallel to a direction in which the base cylinder and the lid cylinder extend through the link being greater than a width of the link in a direction perpendicular to the direction in which the base cylinder and the lid cylinder extend through the link.

20. The portable computer of claim 19, wherein the rubber base shell has a thickness of less than one millimeter and a shore D durometer between fifty and sixty.

21. The portable computer of claim 19, wherein the base rod is made of steel.

22. A portable computer comprising:
  a base;
  a lid;
  a base cylinder extending from the base, a length of the base cylinder being greater than a diameter of the base cylinder, the base cylinder including a base rod and a base shell encasing the base rod, the base shell having a lower hardness than the base rod, a length of the base shell being greater than a diameter of the base shell;
  a lid cylinder extending from the lid, a length of the lid cylinder being greater than a diameter of the lid cylinder, the lid cylinder including a lid rod and a lid shell encasing the lid rod, the lid shell having a lower hardness than the lid rod, a length of the lid shell being greater than a diameter of the lid shell; and
  a link coupling the base cylinder to the lid cylinder with a portion of the base cylinder being exposed, a length of the link in a direction parallel to a direction in which the base cylinder and the lid cylinder extend through the link being greater than a width of the link in a direction perpendicular to the direction in which the base cylinder and the lid cylinder extend through the link, the link fixing a positional relationship between the base cylinder and the lid cylinder so that the base shell frictionally engages with the lid shell.

* * * * *